Feb. 28, 1956  J. E. GLENN  2,736,519
AILERON ACTUATING MECHANISM
Filed July 6, 1954  3 Sheets-Sheet 1

INVENTOR:
John E. Glenn
By Hubert E. Metcalf
His Patent Attorneys

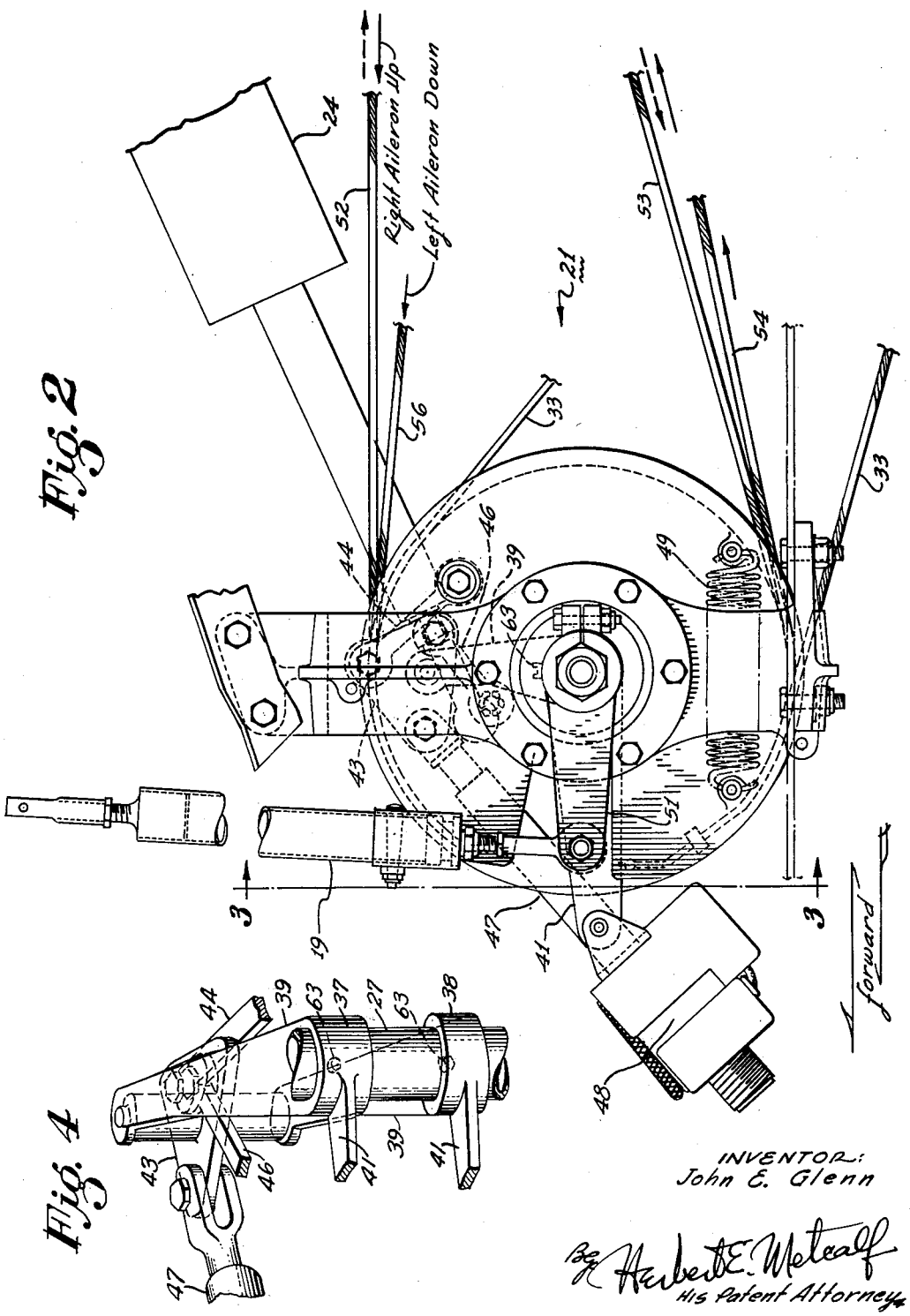

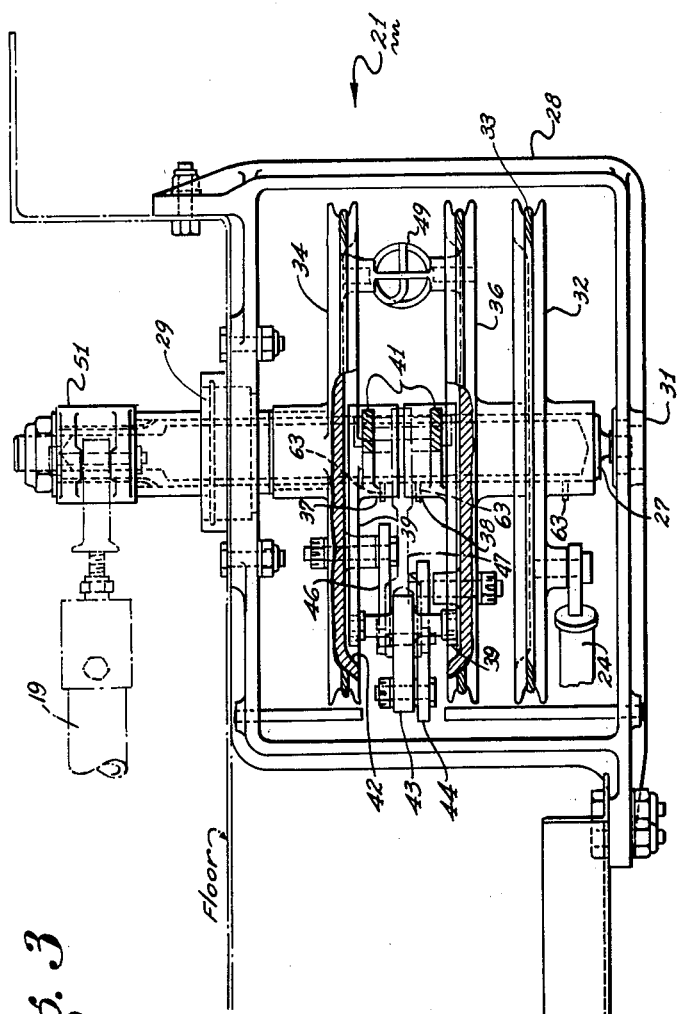

United States Patent Office 2,736,519
Patented Feb. 28, 1956

2,736,519

AILERON ACTUATING MECHANISM

John E. Glenn, Hawthorne, Calif., assignor to Northrop Aircraft, Inc., Hawthorne, Calif., a corporation of California Application July 6, 1954, Serial No. 441,342

4 Claims. (Cl. 244—90)

The present invention relates to improvements in aircraft control systems and more particularly to a combined aileron actuating and droop mechanism.

Since the inception of the first airplane the design of a wing assembly adapted to yield the highest possible lift coefficient, compatible with the stability charactertics of an associated plane, has received major consideration. The lift of wing assemblies has been materially increased by providing flap assemblies which have become conventional equipment in recent years. The problem of lift, however, has assumed greater proportions in recent years with the advent of high speed planes having small wing surfaces incurring higher wing loadings. Accordingly the lift of such wing assemblies has been augmented by lowering each aileron a given amount at such times as the flaps are lowered. The procedure of simultaneously lowering each aileron a given amount to increase the lift of a wing assembly is referred to as aileron "drooping."

The present invention discloses an aileron actuating mechanism including novel means whereby the ailerons may be drooped when desired. Briefly the present invention includes a pair of cable pulleys mounted for free rotary movement on a supporting shaft. Mounted between the pulleys is a linkage assembly which when actuated imparts equal but opposite angular movement to the pulleys which in turn results in the lowering of each aileron an equal amount. The linkage assembly is actuated by an electric motor mounted on and rotating with the aforementioned supporting shaft when the mechanism is utilized to operate the ailerons as lateral control surfaces.

It is an object of the present invention to provide an aileron actuating mechanism whereby the ailerons of an airplane may be drooped and at the same time maintain their effectiveness as lateral control surfaces.

Another object is to provide an aileron actuating mechanism wherein a given movement of the aileron drooping control element results in a predetermined proportional movement of the ailerons throughout the operating range of the mechanism.

Another object is to provide an aileron actuating mechanism which is compact in construction thereby occupying a minimum of space for its installation, which is simple in design and construction, and is efficient and durable in operation.

These and other objects will become more apparent from the following description and drawings in which like reference characters denote like parts. It is to be expressly understood, however, that the drawings are for the purpose of illustration only and not a definition of the limit of the invention, reference being had for this purpose to the appended claims.

In the drawings:

Figure 2 is a plan view of the aileron actuating mechanism of the instant invention.

Figure 3 is a side view of the aileron actuating mechanism as viewed from the line 3—3 of Figure 2 and with parts thereof broken away to better show its interior construction.

Figure 4 is a perspective view of internally located component parts of the actuating mechanism shown in Figures 2 and 3.

Figure 1:
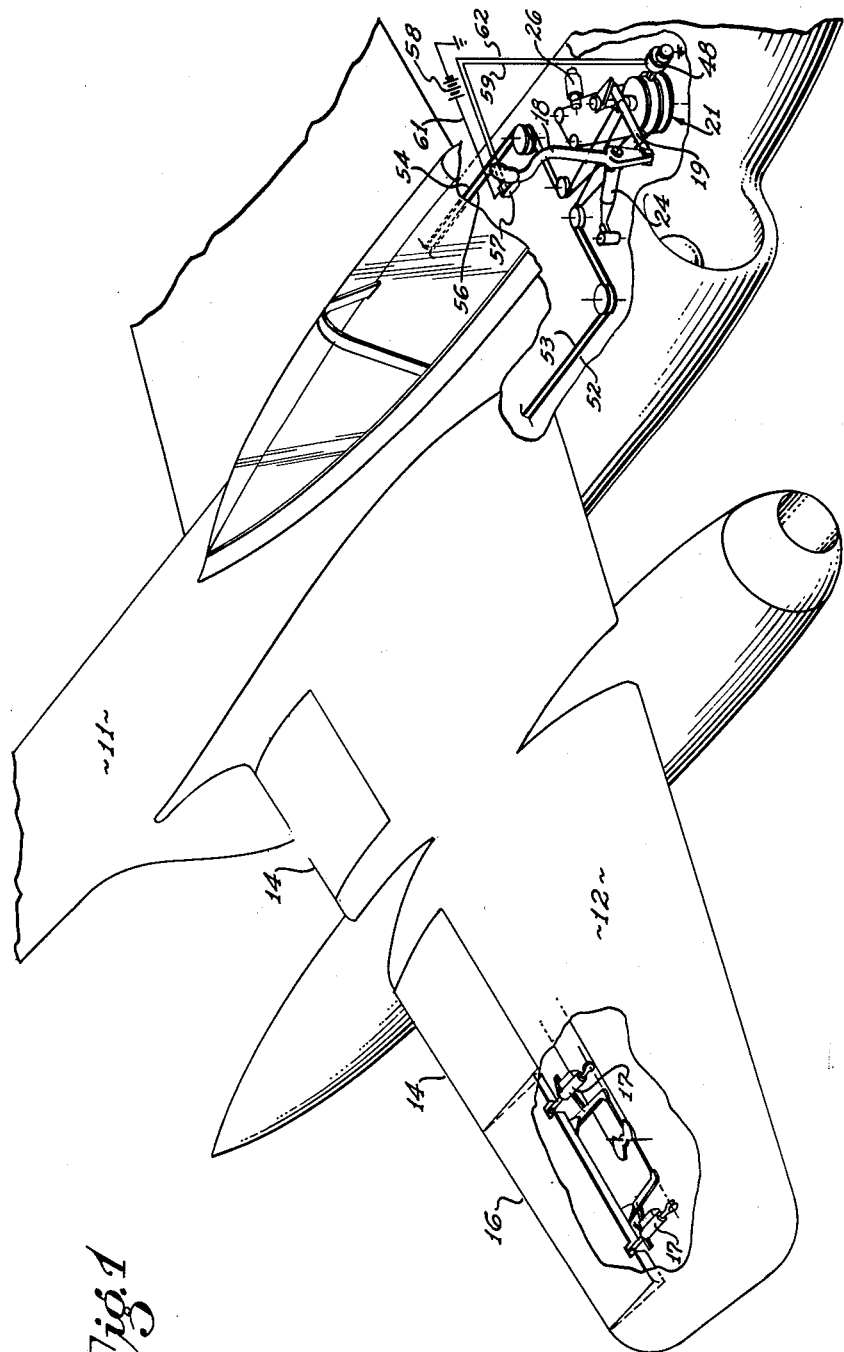
Figure 1 is a fragmentary perspective view of an airplane incorporating the aileron actuating mechanism of the instant invention.

Referring to the drawings for a detailed description of a preferred embodiment of the instant invention, Figure 1 shows portions of an airplane 11 having a laterally extending wing 12. Only one wing is shown in the above mentioned figure, however, it is to be understood that the following description also applies to a similar wing extending from the left side of the plane. Conventional flaps 14 and an aileron 16 is mounted on the trailing edge of the wing 12. The aileron is mounted for pivotal movement on the wing 12 for movement throughout its operational range by a pair of conventional hydraulic servo actuators 17 mounted adjacent each of its end portions.

Mounted in the fuselage of the plane 11 is a pilot's control element 18 connected by suitable linkage 19 to the aileron actuating mechanism 21. Angular movement of certain of the cable pulleys of the mechanism 21 is transmitted to the actuators 17 through a suitable cable system comprising an aileron "up" and an aileron "down" cable. Also connected to the mechanism 21 is a conventional aileron trim and force producer 24 and aileron servo 26 responsive to an automatic pilot (not shown). The force producer and servo are shown for completeness, inasmuch as they do not constitute elements of the instant invention further description of these elements is not deemed necessary.

The aileron actuating mechanism 21 includes a shaft 27 vertically mounted for angular movement in a supporting structure 28. The supporting structure in turn is secured to structural members of the plane so that the mechanism is located below the floor of the pilot's compartment, substantially as shown in Figure 1. The shaft 27 is mounted in the supporting structure by means of bearings 29 and 31. Keyed to the shaft 27 at its lower end is a cable pulley 32 receiving a cable 33. This cable is connected to the servo 26 whereby movements of the latter are transmitted to the mechanism 21 at such times as the automatic pilot is in operation.

The mechanism 21 includes a pair of aileron cable pulleys 34 and 36 mounted on the shaft 27 in spaced relation for free rotational movement thereon. Also mounted on the shaft 27, and located between the pulleys 34 and 36, is a pair of crank members 37 and 38. These cranks constitute a hub portion and a pair of radially extending arms 39 and 41 angularly spaced at approximately ninety degrees (90°) with respect to each other. The cranks are secured to the shaft 27 as by set screws 63 or the like so that angular movement is transmitted between them and the shaft. The crank 37 is positioned, with respect to the pulley 34, so that its arm 39 is positioned and operates in an annular recess 42 provided in the circular face of the pulley 34 opposing the pulley 36. The arm 39 terminates short of the periphery of the pulley 34. The arm 41 is offset with respect to the arm 39 and extends beyond the periphery of each of the pulleys 34 and 36 for a purpose to be explained presently. The crank 38 is positioned similarly as the crank 37 but with respect to the pulley 36.

Pivotally secured between the terminating ends of the cranks 39 is a triangularly shaped link 43. Pivotally attached to one apex of the triangular link and the pulley 36 is a link 44. Similarly attached to another apex of the link 43 and the pulley 34 is a link 46. Pivotally attached to the third apex of the link 43 is one end of a screw member 47 the other end of which threadably engages a rotating part of a bidirectional electric motor 48. The motor 48 is in turn pivotally secured between the terminating ends of the arms 41. The location of the common pivotal axis of the link 43 and member 47, at such time as the latter assumes a fully retracted relationship with respect to the motor 48, is substantially as shown in Figure 2. Also shown in this figure are the locations of the pivotal axes of the links 44 and 46 with respect to the link 43 and pulleys 34 and 36. In this position the common pivotal axis of the member 47 and link 43 is located on one side of a plane containing the axis of the shaft 27 and the pivotal axis of the link 43 on the arms 39. The pivotal axes of the links 44 and 46 on the link 43 are located on the opposite side of the aforementioned plane. The pivotal axis of the link 44 on the pulley 36 is located on the same side of the aforementioned plane as the pivotal axes of the links 44 and 46 on the link 43. The pivotal axis of the link 46 on the pulley 34 is located on the same side of the aforementioned plane as the pivotal axis of the member 47 on the link 43.

The locations of the various pivotal axes as described above are the positions assumed with the pulleys in a first position in which no droop is present in the ailerons. It should now be apparent that upon energizing the motor 48 the link 43 will be pivoted about its axis on the arms 39 in a clockwise direction. This results in an equal but opposite angular movement being imparted to the pulleys 34 and 36 causing them to assume a second position in which full droop is applied to the ailerons. Lost motion which might occur between the links 43, 44 and 46 and the pulleys 34 and 36 is precluded by a prestressed tension spring 49 attached to and extending between lugs projecting from opposing faces of the pulleys. Keyed to the upper end of the shaft 27 is a radial arm 51 the outer end of which is pivotally attached to the linkage 19. Attached to and extending from the pulley 36 to the right wing servo actuators 17 are aileron up and down cables 52 and 53, respectively. Also attached to and extending from the pulley 34 to the left wing actuators are aileron up and down cables 54 and 56, respectively.

In the present embodiment the motor 48 is energized by closing an electric circuit by means of a double throw switch 57. Electric power from a power source 58 flows through the conductors 59 and 61 when the motor is energized to rotate in one direction and through the conductors 61 and 62 at such times as the motor is energized to rotate in the opposite direction. This manner of energizing the motor 48 is illustrative only. It will be clear that the motor 48 may be energized in response to movements of a flap control member (not shown) or movements of the flaps themselves without departing from the spirit of the invention.

The component parts of the aileron actuating mechanism having been described a more complete understanding of its novel features and advantages will be forthcoming from the following description of its operation.

The relative relationship of the pulleys 34 and 36 is normally maintained by the motor 48, member 47, and the links 43, 44, and 46 at such times as the motor is de-energized. Accordingly the pulleys 34 and 36 will be rotated a given amount in either a clockwise or counter-clockwise direction in response to lateral movements of the pilot's control element 18. As shown in Figures 1 and 2 counter-clockwise movement of the pulleys 34 and 36 results in the right hand aileron 16 being raised and the left hand aileron being lowered. Under this set of conditions the aileron cables are moved in the directions as indicated by the solids arrows in Figure 2.

The relative relationship of the pulleys 34 and 36 is altered if it is desired to utilize the ailerons to augment the lift coefficient of the wing 12 and flaps 14. To alter the relative relationship of the pulleys 34 and 36 the motor 48 is energized. In the present embodiment this is accomplished by the pilot moving the switch 57 to one of its closed positions. This, for example, results in current flowing through the conductor 59 to produce counter-clockwise rotation of the motor 48. Counter-clockwise rotation of the motor results in clockwise rotation of the link 43 about its pivotal axis on the arms 39. This rotary movement is imparted to the pulleys 34 and 36 through the links 46 and 44, respectively. As previously disclosed the links 43, 44 and 46 are proportioned and arranged with respect to each other and the pulleys 34 and 36 so that the pulleys will be pivoted equal angular amounts, but in opposite directions, in response to a given angular movement of the link 43. Thus a clockwise movement of the link 43 results in a counter-clockwise movement of the pulley 34 and an equal clockwise movement of the pulley 36. Thus it is seen the cables 52 and 53 are caused to move in the direction indicated by the broken line arrows. Accordingly the right aileron will be lowered an amount corresponding to the movement of pulley 36. The cables 54 and 56 will be moved in the directions indicated by the solid line arrows associated with these cables thereby lowering the left aileron the same amount as the right aileron. The ailerons are now referred to as being in a drooped position.

With the ailerons in their drooped position the new relative relationship of the pulleys 34 and 36 is maintained by the cooperative effort of the aforementioned elements. The pulleys 34 and 36 will respond to lateral movements of the pilot's control element as before and the ailerons will function as lateral control surfaces in addition to increasing the lifting power of the wings. The ailerons may be simultaneously raised (droop removed) when desired by energizing the motor 48 so that the latter rotates in a clockwise direction. From the above discussion it will be apparent that the pulleys 34 and 36 will be returned to their original relative relationship and all droop will be removed from the ailerons.

From the above discussion it will be apparent that an aileron actuating mechanism has been provided which permits the ailerons to be drooped and permits them to be utilized as conventional ailerons although they are in a drooped attitude. It should also be apparent that the power ratio of the mechanism remains constant throughout its operation as the length of the arms 39 and 51 remain constant. Inasmuch as the arms 39 operate in recessed portions of the pulleys 34 and 36 also the fact that the links 43, 44, and 46, the member 47, and the arms 41 are for the most part located between the pulleys 34 and 36, the mechanism 21 is extremely compact in design and construction and its component parts shielded from other moving parts of the plane.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A mechanism of the class described comprising: a supporting structure; a shaft rotatably mounted in said structure; a pair of cable pulleys mounted for angular movement on said shaft and having respective first positions in which a predetermined angular relationship exists therebetween and being movable through operating ranges to respective second positions in which the pulleys are angularly moved an equal amount from said first positions thereof in opposite directions; a pair of spaced arms keyed to and extending radially from said shaft; an operating link located between and pivotally supported by the free ends of said arms; first and second links pivotally attached to said link at spaced positions and spaced from the pivotal axis of said link on said arms and extending between said operating link and one of said pulleys, respectively; actuating means adapted to pivot said operating link about the pivotal axis thereof on said arms when energized; said actuating means, operating link, and first and second links cooperating to move said pulleys between said first and second respective positions when said actuating means is energized and to maintain said pulleys at any position in said operating ranges when said actuating means is de-energized; and means secured to said shaft for imparting angular movements thereto.

2. A mechanism as set forth in claim 1, further characterized by said pair of spaced arms being positioned between said pair of cable pulleys; said actuating means comprising a bidirectional electric motor mounted on a radial arm fixedly secured to said shaft; and including a screw member having one end threadably engaging a mating rotational part of said motor and the other end pivotally attached to said operating link.

3. A mechanism as set forth in claim 2, further characterized in that the pivotal axis of said operating link on said arms is spaced a predetermined radial distance from the axis of said shaft which radial distance remains constant throughout the operating ranges of said pulleys.

4. A mechanism as set forth in claim 3, further characterized by the screw member and first and second links being attached to said operating link and pulleys so that the pivotal axes of said screw member on said operating link and said first link on said respective pulley are located on one side of a common plane containing the axes of said shaft and operating link on said arms and the pivotal axes of said first and second links on said operating link and said second link on said respective pulley are located on the other side of said common plane at all times during the operation of said mechanism.

References Cited in the file of this patent

UNITED STATES PATENTS

| | | |
|---|---|---|
| 2,376,731 | Stoner | May 22, 1945 |
| 2,494,208 | Schultz | Jan. 10, 1950 |
| 2,582,348 | Northrop | Jan. 15, 1952 |